United States Patent
Buchanan, Jr. et al.

(10) Patent No.: US 11,399,218 B2
(45) Date of Patent: Jul. 26, 2022

(54) METHODS AND SYSTEMS FOR VERIFICATION OF ASSET AVAILABILITY

(71) Applicant: Comcast Cable Communications, LLC, Philadelphia, PA (US)

(72) Inventors: Lewis Richard Buchanan, Jr., Denver, CO (US); Joshua Kshensky Arensberg, Brooklyn, NY (US)

(73) Assignee: COMCAST CABLE COMMUNICATIONS, LLC, Philadelphia, PA (US)

( * ) Notice: Subject to any disclaimer, the term of this patent is extended or adjusted under 35 U.S.C. 154(b) by 469 days.

(21) Appl. No.: 15/261,834

(22) Filed: Sep. 9, 2016

(65) Prior Publication Data

US 2018/0077464 A1    Mar. 15, 2018

(51) Int. Cl.
| | |
|---|---|
| *H04N 21/482* | (2011.01) |
| *H04N 21/266* | (2011.01) |
| *H04N 21/472* | (2011.01) |
| *H04N 21/4722* | (2011.01) |
| *H04N 21/2225* | (2011.01) |

(52) U.S. Cl.
CPC ..... *H04N 21/4828* (2013.01); *H04N 21/2225* (2013.01); *H04N 21/266* (2013.01); *H04N 21/4722* (2013.01); *H04N 21/47202* (2013.01)

(58) Field of Classification Search
CPC ........... H04N 5/44543; H04N 21/4622; H04N 21/482; H04N 21/84; H04N 21/4821; H04N 21/4345; H04N 21/4316; H04N 21/47; H04N 5/44591; H04N 21/4828; H04N 21/4532; H04N 21/47214; H04N 21/2225; H04N 21/266; H04N 21/4702; H04N 21/4722
See application file for complete search history.

(56) References Cited

U.S. PATENT DOCUMENTS

| | | | |
|---|---|---|---|
| 8,505,057 | B2 | 8/2013 | Rogers |
| 9,232,275 | B2 | 1/2016 | Perez |
| 2004/0103120 | A1 | 5/2004 | Fickle et al. |
| 2005/0055718 | A1 | 3/2005 | Stone |
| 2005/0234992 | A1 | 10/2005 | Haberman |
| 2008/0097984 | A1* | 4/2008 | Candelore ......... G06F 17/30253 |
| 2008/0307463 | A1* | 12/2008 | Beetcher ........... G06F 17/30017 725/53 |
| 2009/0150553 | A1* | 6/2009 | Collart .............. G06F 17/30017 709/229 |
| 2009/0172757 | A1* | 7/2009 | Aldrey .................. H04N 7/165 725/110 |

(Continued)

OTHER PUBLICATIONS

Agama Technologies AB, "Agama Verifier Advanced" [Retrieved from http://www.agama.tv/products/content-verification-tools/agama-verifier-advanced][Retrieved on: Apr. 1, 2016] (4 pages).

(Continued)

*Primary Examiner* — Ngoc K Vu
(74) *Attorney, Agent, or Firm* — Ballard Spahr LLP

(57) ABSTRACT

The present disclosure relates to verifying that a content asset is present at a user level. The present disclosure provides video hosting and service (VHS) management systems and methods that can both accurately and timely verify availability of VHS content from multiple content providers using multiple distribution systems.

20 Claims, 7 Drawing Sheets

(56) References Cited

U.S. PATENT DOCUMENTS

| | | | |
|---|---|---|---|
| 2011/0158610 A1* | 6/2011 | Paul | G06F 17/30029 |
| | | | 386/297 |
| 2012/0023126 A1* | 1/2012 | Jin | G06F 16/73 |
| | | | 707/769 |
| 2014/0122601 A1* | 5/2014 | Poston | H04L 67/36 |
| | | | 709/204 |
| 2015/0220644 A1* | 8/2015 | Motoyama | G06F 16/9032 |
| | | | 707/706 |
| 2016/0007053 A1 | 1/2016 | Mao | |
| 2016/0014461 A1 | 1/2016 | Leech et al. | |

OTHER PUBLICATIONS

Witbe, "Controlling the delivered quality in a triple play context—Industry challenges & state of the art methods" [Retrieved from http://www.csimagazine.com/pdf/Witbe_whitepaper_tripleplay.pdf][Retrieved on: Jul. 10, 2018] (4 pages).

Witbe, "Know your Set-top box know your customer satisfaction" [Retrieved from http://www.csimagazine.com/pdf/Witbe_whitepaper_set_top_box.pdf][Retrieved on: Jul. 10, 2018] (6 pages).

Witbe, "Witbe and Standards" [Retrieved from http://www.csimagazine.com/pdf/witbe_and_standards_en.pdf][Retrieved on: Jul. 10, 2018] (2 pages).

* cited by examiner

METHODS AND SYSTEMS FOR VERIFICATION OF ASSET AVAILABILITY

BACKGROUND

Video hosting and streaming (VHS) services provide content to viewers for immediate viewing upon request. While this content typically comprises pre-recorded video content, this content may also include, but is not limited to, live content, audio content, image content, and the like. A VHS system allows users to view remotely-served content in real-time (e.g., streaming), or download the content to a device such as a computer or digital video recorder for viewing at any time.

Content providers are contractually obligated to make certain types of content available via a VHS system within a certain time period. However, the content providers have limited options for verifying that a particular content asset is actually available to users within the time period. Existing VHS systems enable the content provider to verify that the particular content asset merely resides on a VHS server. However, no system exists that enables the content provider to quickly, and on a large scale, verify that the particular content asset available at the user level. In other words, to verify that the particular content asset is listed and is accessible from a menu of a client or user device (e.g., set-top box).

Accordingly, it would be advantageous to develop systems and methods capable of verifying the availability of a content asset at the user level.

SUMMARY

It is to be understood that both the following general description and the following detailed description are exemplary and explanatory only and are not restrictive. Methods and systems for verification of content asset availability at a user level are disclosed. The disclosed methods and systems can be configured to utilize a computing device coupled to a user device, such as a set-top box, to virtually access video output from the user device. By virtually accessing the video output, the computing device can generate and navigate a user interface, such as an electronic program guide or other menu structure provided by a service provider responsible for delivering content assets to the user device. The computing device can utilize a command file that comprises a plurality of commands predetermined for use in navigating the user interface. The command file can be customized for the service provider responsible for delivering the content assets to that user device. The computing device can access the command file and transmit commands to the user device via a remote controller (for example, an infrared transmitter). Using the commands and optical character recognition (OCR), the computing device can navigate the user interface and locate a title or other identifier of the content asset (or determine that the title or other identifier of the content asset cannot be located). The computing device can further virtually access (e.g., play) the content asset to confirm that the title or other identifier of the content asset is not only present in the user interface, but that the content asset can actually be accessed (e.g., played). Verification data for the content asset can be generated and transmitted based on locating the title or other identifier of the content asset and/or successful virtual accessing of the content asset. The verification data can be transmitted to a remote computing device where it may be stored for later retrieval and/or analysis.

Additional advantages will be set forth in part in the description which follows or may be learned by practice. The advantages will be realized and attained by the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
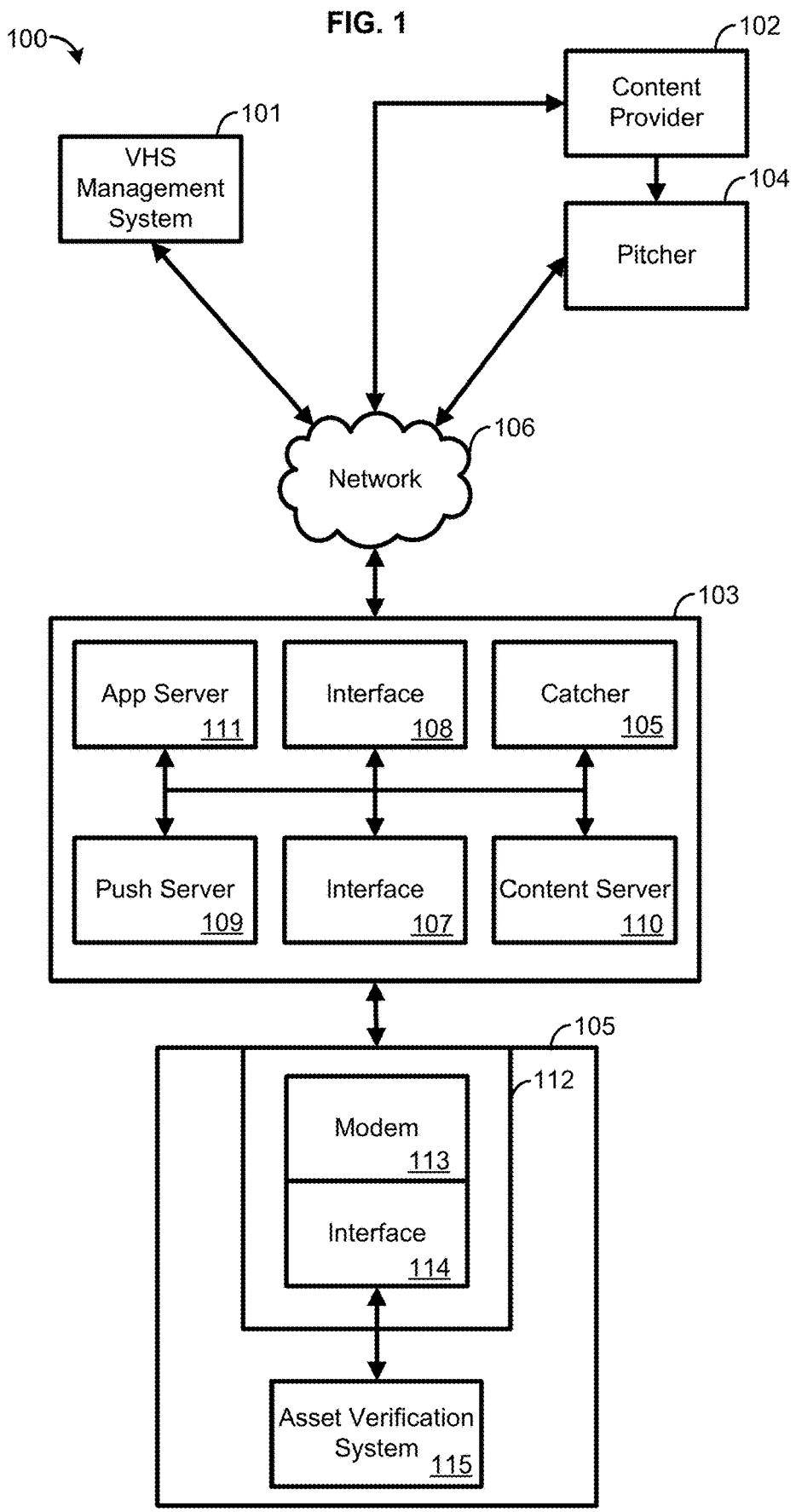
FIG. 1 is an example operating environment for asset verification.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods.

Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

In various instances, this detailed description may refer to content items (which may also be referred to as "content," "content data," "content information," "content asset," "multimedia asset data file," or simply "data" or "information"). In some instances, content items can comprise any information or data that may be licensed to one or more individuals (or other entities, such as business or group). In various embodiments, content may include electronic representations of video, audio, text and/or graphics, which may include but is not limited to electronic representations of videos, movies, or other multimedia, which may include but is not limited to data files adhering to MPEG2, MPEG, MPEG4 UHD, HDR, 4k, Adobe® Flash® Video (.FLV) format or some other video file format whether such format is presently known or developed in the future. In various embodiments, the content items described herein may include electronic representations of music, spoken words, or other audio, which may include but is not limited to data files adhering to the MPEG-1 Audio Layer 3 (.MP3) format, Adobe®, CableLabs 1.0, 1.1, 3.0, AVC, HEVC, H.264, Nielsen watermarks, V-chip data and Secondary Audio Programs (SAP). Sound Document (.ASND) format or some other format configured to store electronic audio whether such format is presently known or developed in the future. In some cases, content may include data files adhering to the following formats: Portable Document Format (.PDF), Electronic Publication (.EPUB) format created by the International Digital Publishing Forum (IDPF), JPEG (.JPG) format, Portable Network Graphics (.PNG) format, dynamic ad insertion data (.csv), Adobe® Photoshop® (.PSD) format or some other format for electronically storing text, graphics and/or other information whether such format is presently known or developed in the future. In some embodiments, content items may include any combination of the above-described examples.

In various instances, this detailed disclosure may refer to consuming content or to the consumption of content, which may also be referred to as "accessing" content, "providing" content, "viewing" content, "listening" to content, "rendering" content, or "playing" content, among other things. In some cases, the particular term utilized may be dependent on the context in which it is used. For example, consuming video may also be referred to as viewing or playing the video. In another example, consuming audio may also be referred to as listening to or playing the audio.

Note that in various instances this detailed disclosure may refer to a given entity performing some action. It should be understood that this language may in some cases mean that a system (e.g., a computer) owned and/or controlled by the given entity is actually performing the action.

The present disclosure relates to verifying a content asset is present at a user level. The present disclosure provides for VHS management systems and methods to accurately and timely verify availability of VHS content from multiple content providers using multiple distribution systems. Examples of VHS management systems include, but are not limited to, Video-On-Demand (VOD) systems and streaming services such as Netflix®, Hulu®, and the like. Further, the present disclosure provides for VHS management systems and methods for capturing data associated with the VHS content in a database for trending analytics.

FIG. 1 depicts an example system 100 on which the various features described herein may be implemented. The system 100 can comprise a network 106 used for transmission of data between various components of the system 100. The network 106 may be any type of information distribution network. One example may be an optical fiber network, a coaxial cable network, internet connection, and/or a hybrid fiber/coax distribution network. The network 106 may include, for example, networks of Internet devices, telephone networks, cellular telephone networks, fiber optic networks, local wireless networks (e.g., WiMAX), satellite networks, and any other desired network. The network 106 can use a series of interconnected communication links (e.g., coaxial cables, satellite distribution, optical fibers, wireless, etc.) to connect a video host and stream (VHS) management system 101, a content provider 102, a multiple-system operator (MSO) 103 (e.g., local office or headend), and a premises 105 (e.g., business, home, etc.).

The content provider 102 can create, produce, distribute, etc. . . . content that is embodied in one or more multimedia asset data files (e.g., content assets). The content provider 102 can be, for example, one or more of a television broadcast company, a movie studio, a web site or service, an audio source, and the like.

The MSO 103 can be an operator of multiple cable or direct-broadcast satellite television systems. The MSO 103 can be a multichannel video programming distributor (MVPD). The MVPD can be a service provider that delivers video programming services. The MSO 103 can be, for example, a direct-broadcast satellite (DBS) provider, a cable television (CATV) system, and/or a competitive local exchange carrier (CLEC). The MSO 103 can communicate with the network 106. The MSO 103 may transmit downstream information signals to the premises 105 via the network 106 or another network. The premises 105 may have an interface 112 used to receive and process those signals. The MSO 103 may include an interface 107, such as a termination system (TS). More specifically, the interface 107 may be a cable modem termination system (CMTS), which may be a computing device configured to manage communications between devices such as a push notification server 109, a content server 110, and an application server 111. The interface 107 may be as specified in a standard, such as the Data Over Cable Service Interface Specification (DOCSIS) standard. The interface 107 may be configured to place data on one or more downstream frequencies to be received by the interface 112 via a modem 113 at the premises 105, and to receive upstream communications from the interface 112 via the modem 113 on one or more upstream frequencies.

The MSO 103 may include a variety of servers 109-111 that may be configured to perform various functions. For example, the MSO 103 may include the push notification server 109. The push notification server 109 may be one or more computing devices that are configured to generate push notifications to deliver data and/or commands to the premises 105 via the interface 114.

The content server 110 may be one or more computing devices that are configured to provide content to the premises 105. The content server 110 can be a VHS server. This content may be, for example, advertisements (such as commercials), video on demand movies, television programs, songs, text listings, etc. The content server 110 may include software to validate user identities and entitlements, to locate and retrieve requested content, to encrypt the content, and to initiate delivery (e.g., streaming or downloading) of the content to the requesting user(s) and/or device(s). The content server 110 may also be configured to generate advertising decisions and rules, and transmit them to a requesting user or device.

The application server 111 may be one or more computing devices configured to offer any desired service. For example, the application server 111 may be responsible for collecting television program listings information and generating a data download for electronic program guide listings. As another example, the application server 111 may be responsible for monitoring user viewing habits and collecting that information for use in selecting advertisements. As another example, the application server 111 may be responsible for formatting and inserting advertisements in, for example a video stream being transmitted to the premises 105. Although shown separately, one of ordinary skill in the art will appreciate that the push server 109, the content server 110, and the application server 111 may be combined.

The premises 105, such as a home, may include the interface 112. The interface 112 may include any communication circuitry needed to allow a device to communicate on one or more links with other devices at the MSO 103. For example, the interface 112 may include the modem 113, which may include transmitters and receivers used to communicate with the MSO 103. The modem 113 may be, for example, a coaxial cable modem (for coaxial cable lines), a fiber interface node (for fiber optic lines), twisted-pair telephone modem, cellular telephone transceiver, satellite transceiver, local Wi-Fi router or access point, or any other desired modem device. Also, although only one modem is shown in FIG. 1, a plurality of modems operating in parallel may be implemented within the interface 112. Further, the interface 112 may include a gateway interface device 114. The modem 113 may be connected to, or be a part of, the gateway interface device 114. The gateway interface device 114 can be a computing device that communicates with the modem 113 to allow one or more other devices in the premises 105 to communicate with the MSO 103 and other devices beyond the MSO 103. The gateway interface device 114 may be a set-top box, digital video recorder (DVR), computer server, or any other desired computing device. The gateway interface device 114 may also include (not shown) local network interfaces to provide communication signals to requesting entities/devices in the premises 105. Examples of the local network interfaces include Multimedia Over Coax Alliance (MoCA) interfaces, Ethernet interfaces, universal serial bus (USB) interfaces, wireless interfaces (e.g., IEEE 802.11, IEEE 802.15), analog twisted pair interfaces, BLUETOOTH interfaces, and others.

Figure 2:
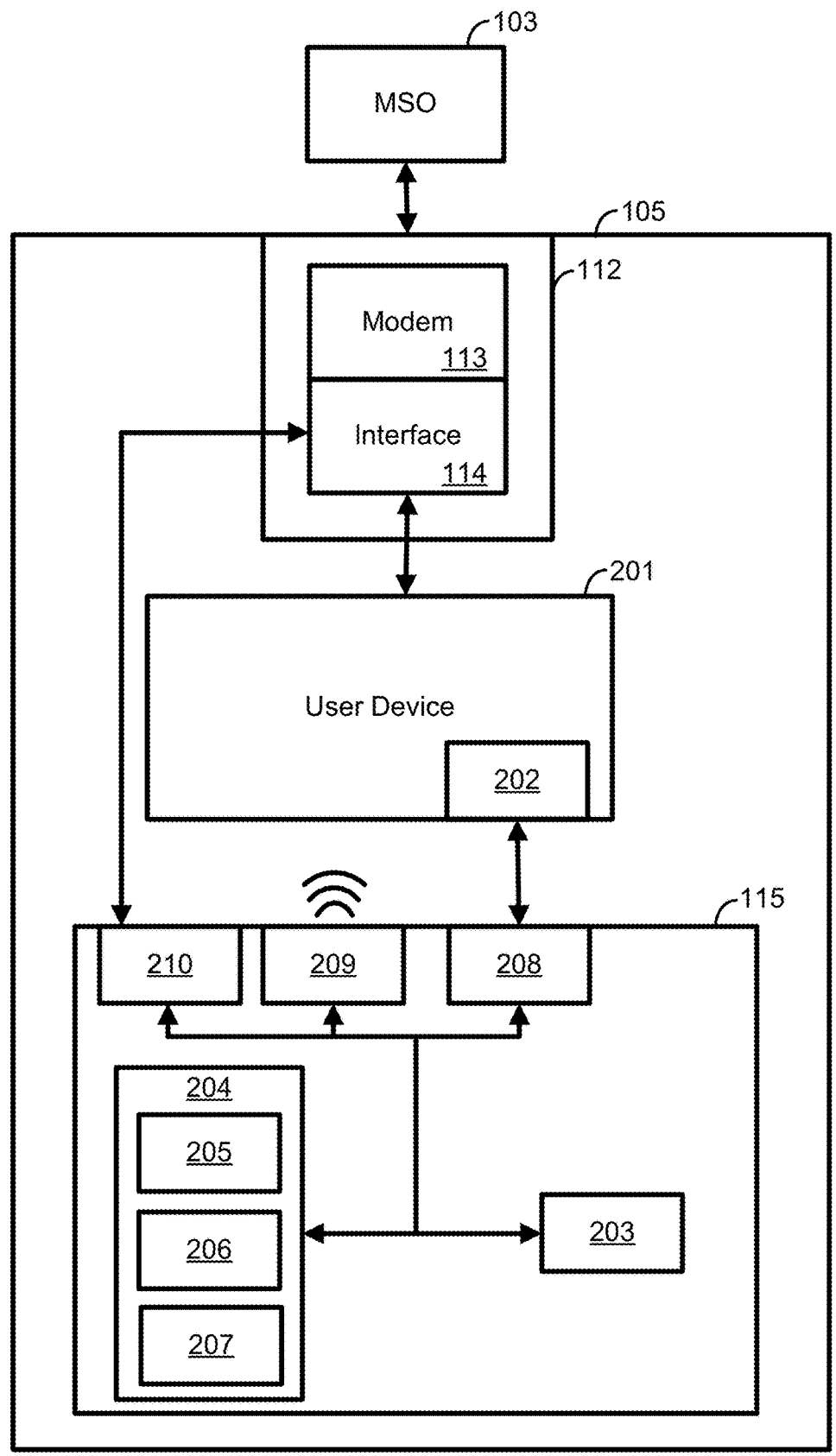
FIG. 2 is an example asset verification system.

The premises 105 can include an asset verification system 115. The asset verification system 115 can comprise one or more computing devices coupled to the gateway interface device 114. The asset verification system 115 can thus receive data from and communicate data to the MSO 103 and other devices beyond the MSO 103. The asset verification system 115 can be configured to confirm that a particular multimedia asset data file is available at the premises 105. The asset verification system 115 can be configured to analyze the quality of audio and video, collect time stamp data, check for watermarks, and deliver such information to an offsite database. An example asset verification system 115 is shown in FIG. 2.

Returning to FIG. 1, the VHS management system 101 can be configured to accept data and instructions from the content provider 102 and the MSO 103. In an aspect, the VHS management system 101 can be used to manage, distribute, and track multimedia asset data files and associated metadata. The multimedia asset data files may be assigned an identification number to allow the VHS management system 101 to track the location and status of the multimedia asset data file at any time. A user interface can be provided for the content provider 102 to communicate with the VHS management system 101. The content provider 102 may transmit metadata to the VHS management system 101 using a variety of formats, including, but not limited to, CableLabs XML, MOD, tab delineated files, and the like. Using the user interface, the content provider 102 can track transmission of multimedia asset data files and can transmit related metadata using a suitable internet protocol, such as, e.g., HyperText Transfer Protocol ("HTTP") or File Transfer Protocol ("FTP"). For example, the content provider 102 may use the user interface to provide the VHS management system 101 with the name of a multimedia asset data file, a description of the multimedia asset data file, the MSO 103 scheduled to receive the multimedia asset data file, a target ship date for delivery of the multimedia asset data file to the MSO 103, an actual ship date for delivery of the multimedia asset data file to the MSO 103, and a delivery method for the multimedia asset data file. The content provider 102 may also specify that different multimedia asset data files form a single delivery group that contains several different features. The delivery group may, for example, contain several different movies and, accordingly, the multimedia asset data files that are associated with those movies. References herein to the transmission and delivery of multimedia asset data files individually will also be understood to also refer to the transmission and delivery of multimedia asset data files in delivery groups.

Using the user interface, the content provider 102 can specify the calendar dates during which a particular multimedia asset data file will be made available for delivery to the MSO 103 (and, therefore, for purchase/rental by end users of the MSOs 103). The content provider 102 can be assigned a provider ID, and transmissions from the content provider 102 to the VHS management system 101 can include the provider ID. Based upon the provider ID and a provider asset ID (e.g., an asset identifier provided by the content provider 102), the VHS management system 101 can assign a globally unique identifier to the corresponding multimedia asset data file to identify the file throughout the content delivery process.

As with the content provider 102, the MSO 103 can communicate with the VHS management system 101 using a user interface. The VHS management system 101 coordinates the metadata and multimedia asset data file ingestion and validation process using a workflow customizable by the MSO 103. In general, the workflow can require that the metadata and multimedia asset data file comply with values and business rules provided by the MSO 103 before the VHS management system 101 will determine that the metadata and multimedia asset data file was properly received.

The VHS management system 101 enables campaign management functionality designed to increase visibility for the content provider 102 (and the MSO 103) into the preparation and distribution of multimedia asset data files. The VHS management system 101 enables the content provider 102 and the MSO 103 to view and analyze metadata and scheduling information. For example, if multimedia asset data files are scheduled to be delivered in delivery groups, the VHS management system 101 enables the content provider 102 to locate an existing/scheduled delivery group by searching for one of the following parameters: the name of a specific delivery group; delivery groups that contain a specific multimedia asset data file, e.g., delivery groups that contain a specific movie or other feature; delivery groups that are scheduled for the MSO 103; the status of delivery groups, e.g., in progress, approved, completed, and the like; or the scheduled target delivery date. The campaign management functionality of the VHS management system 101 enables the content provider 102 and/or the MSO 103 to verify that a particular multimedia asset data file is available at the MSO 103 for consumption at the premises 105 by communicating with the asset verification system 115.

In operation, the content provider 102 can use a pitcher 104 to transmit a multimedia asset data file to the MSO 103 via the network 106. The multimedia asset data file may be scheduled for individual transmission to the MSO 103, or a group of multimedia asset data files may be scheduled for transmission within a delivery group to the MSO 103. Although only one pitcher 104 is illustrated, it will be appreciated that the content provider 102 may implement a plurality of pitchers. The pitcher 104 can be a computing device that is responsible for initiating and coordinating the transfer of the multimedia asset data file to the MSO 103. The pitcher 104 can deconstruct the multimedia asset data file into smaller elements in order to expedite the transfer of the multimedia asset data file to the MSO 103. The pitcher 104 can also augment the multimedia asset data file with metadata. The pitcher 104 transmits the multimedia asset data file, along with associated metadata, to a catcher 105 at the MSO 103 using the network 106, various forms of a CDN (Content Delivery Network), or any suitable multimedia asset distribution system. For example, the multimedia asset distribution system can comprise a satellite distribution channel. The satellite distribution channel may include, for example, an Internet Protocol ("IP") encapsulator that is coupled to both the pitcher 104 and a satellite uplink facility. The IP encapsulator can be configured to relay transmissions from the pitcher 104 to the satellite uplink facility. The satellite uplink facility then transmits the data elements of the multimedia asset data file to various orbiting satellites, which in turn transmit the elements to a satellite downlink facility of the MSO 103. The MSO 103 implements the catcher 105 coupled to the MSO 103 satellite downlink facility and configured to receive transmissions originating from the content provider 102.

The catcher 105 at the MSO 103 can be a computing device. To process multiple data transmissions from multiple content providers, the MSO 103 may utilize a farm containing a plurality of catchers, or use multiport catchers configured to simultaneous receive a plurality of transmissions from multiple content providers. In addition to satellite transmissions, the catcher 105 can receive multimedia asset data files locally using physical media (e.g., tapes or disks) and/or a local network. For example, the catcher 105 may be coupled to a FTP server to obtain multimedia assets from the FTP server via the network 106. The catcher 105 can be configured to confirm successful receipt of transmissions originating from the pitcher 104. Accordingly, the catcher 105 can communicate with the VHS management system 101 via the network 106. The catcher 105 can acknowledge to the VHS management system 101 a successful or failed transmission, and in the event of a failed transmission, request a complete or partial retransmission of the multimedia asset data file that was not properly received. The pitcher 104 can also communicate with the VHS management system 101 via the network 106. The pitcher 104 utilizes the network 106 to inform the VHS management system 101 if a transmission is initiated by the pitcher 104. A campaign management function of the VHS management system 101 can be used by the content provider 102 and/or the MSO 103 to verify that the multimedia asset data file is available at the MSO 103 at the catcher 105 based on the catcher 105 acknowledging successful receipt of the multimedia asset data file.

The multimedia asset data file can be transferred from the catcher 104 to the content server 110. The content server 110 can transmit the multimedia asset data file to a requesting user at the premises 105 via the interface 112. The content server 110 can manage receipt and fulfillment of a VHS request from the interface 112, including session setup and stream control management of the multimedia asset data file. In response to a VHS request from the interface 112, the content server 110 can cause the multimedia asset data file to be streamed to the interface 112 via for example, a separate streaming server, an edge QAM, and/or the interface 107 (e.g., CMTS which can provide IP-based streaming to the interface 112).

The asset verification system 115 can verify that the multimedia asset data file is available for consumption at a user level. User level refers to availability of the multimedia asset data file for being viewed by an end-user of services provided by the MSO 103. For example, availability through a VHS system (e.g., content server 110). The asset verification system 115 can virtually read a program guide via Optical Character Recognition (OCR), access the program guide, navigate to a VHS menu/VHS search function, search for the multimedia asset data file, confirm the presence of the multimedia asset data file in a search result, and record the time the multimedia asset data file was, is, or will be available. In another aspect, the asset verification system 115 can virtually access (e.g., play, cause to play) the multimedia asset data file to verify availability. The asset verification system 115 can generate verification data that reflects the availability of the multimedia asset data file. The verification data can comprise, for example, a log comprising the content provider 102 (e.g., provider ID) that is the source of the multimedia asset data file, the title of the multimedia asset data file, an identifier of the multimedia asset data file (e.g., asset identifier provided by the content provider 102 and/or the globally unique identifier provided by the VHS management system 101), and a timestamp indicative of a date and/or time that the multimedia asset data file was identified in a search result or was successfully accessed. The asset verification system 115 can communicate the verification data to one or more of the VHS management system 101, the content provider 102, and the MSO 103.

For example, in operation, the VHS management system 101 can receive data from the content provider 102 comprising an identifier of a content asset, a start date associated with the content asset, and a folder path associated with one or more of a plurality of service providers (e.g., MSOs 103). The VHS management system 101 can transmit the identifier of the content asset to one or more of a plurality of asset verification systems 115, wherein each of the one or more of the plurality of asset verification systems is associated with one of the plurality of service providers. The VHS management system 101 can then receive real-time verification data from each of the one or more of the plurality of asset verification systems 115 that the content asset is available at a plurality of user devices 112 by navigating a user interface of the plurality of user devices 112.

Figure 3:
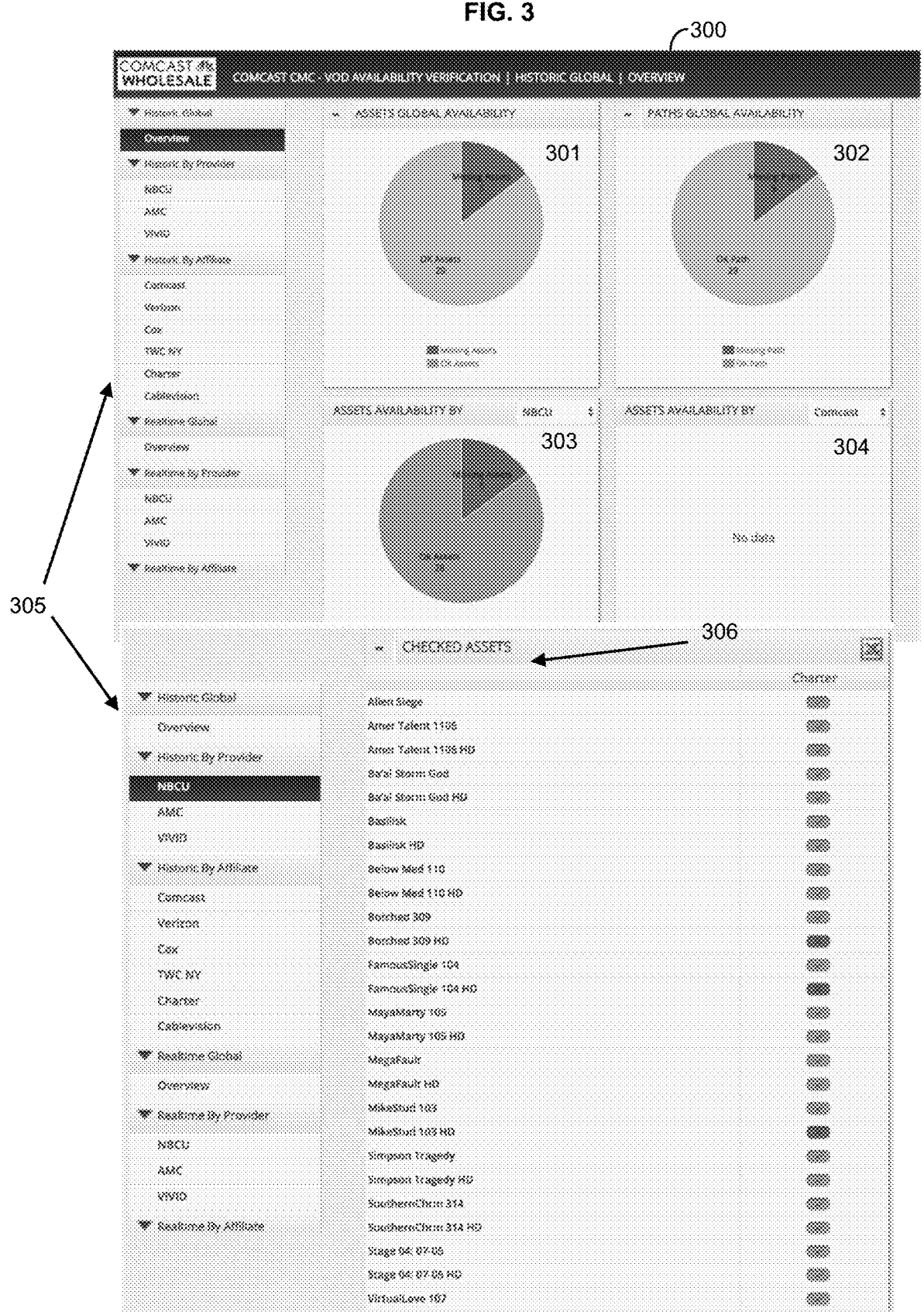
FIG. 3 is an example user interface of an asset verification system.

The VHS management system 101 can provide access to the verification data via the campaign management function. For example, one or more key performance indicator (KPI) dashboards can be generated based on the verification data and provided to the content provider 102 and/or the MSO 103. For example, one or more KPI dashboards can be generated to indicate availability of the expected multimedia asset data files via a graphic user interface (GUI) configured to sort the multimedia asset data files by the program supplier or the MSO 103, a number of multimedia asset data files checked, a number of multimedia asset data files missing, a success rate of timely availability of multimedia asset data files for the MSO 103, a list of missing multimedia asset data files. An example KPI dashboard is shown in FIG. 3.

In an aspect, a KPI dashboard 300 can be generated based on the verification data and can dynamically update as more verification data is gathered. The KPI dashboard 300 can display information that reflects availability of multimedia assets. In operation, if querying the VHS system for availability of multimedia assets, the KPI dashboard 300 can be configured to include a time stamp associated with the query and results of the query. The information on the KPI dashboard 300 can be intermittently refreshed to confirm the availability or termination of a multimedia asset lifecycle. The KPI dashboard 300 can provide a summary of multimedia assets checked through the VHS system. The summary information can be provided via a graphical object, such as a pie chart or similar. For example, an asset chart 301 is a pie chart detailing multimedia assets both missing and available globally through the VHS system. Asset charts 301, 302, and 303 indicate a number of assets verified as OK Assets (available) and Missing Assets. Asset chart 304 indicates a number of folder paths the VHS system can check to verify availability of multimedia assets. In an aspect, the information on the KPI dashboard 300 can be a real-time summary partitioned by single provider across all distributors, all providers by distributor, or by provider with respect to a single distributor. Alternatively, the information can be historical, with the time period selected by the user.

In an aspect, a user can select/alter configurations for the KPI dashboard 300 at any time by selecting various options on a configuration menu 305. A checked asset list 306 can be provided to list all the assets selected for verification by the VHS system. The asset list 306 can be configured to provide color coded indications (e.g., buttons) of multimedia assets that have been identified (e.g., found or not) by the VHS system. For example, a green color can indicate that a multimedia asset has been identified as available and a red color can indicate that a multimedia asset that should be available has not been identified. In an aspect, additional colors can be used to indicate other asset provider scenarios and/or asset availability. For example, in scenarios where multimedia assets are provided by multiple distributors, a grey color may be used to indicate that an asset is not destined for a particular distributor. As such, if a user accesses a grey colored button associated with an asset, the KPI dashboard 300 can be configured to provide a pop up screen that describes the individual folder path for the particular asset at that distributor.

The VHS management system 101 can provide a direct link to download a video of a multimedia asset data file's verification such that the video of the multimedia asset data file's verification is placed in an individual asset and folder path. In an aspect, a folder path can comprise a menu/navigation structure provided via the interface 112. Such actions and information enable measurement of propagation time associated with the multimedia asset data file at each system location. Propagation time can be, for example, an amount of time passed between when a multimedia asset data file was authorized to be made available to when the multimedia asset data file was made available, an amount of time passed between when a multimedia asset data file was supposed to be made available to when the multimedia asset data file was made available, an amount of time passed between when a multimedia asset data file was made available and when the multimedia asset data file was made unavailable, combinations thereof, and the like.

An example asset verification system 115 is shown in FIG. 2. The asset verification system 115 can comprise a computing device. The asset verification system 115 can be coupled to a user device 201. The user device 201 can comprise the interface 114. For example, the user device 201 can comprise a set-top box, or other computing device configured for providing access to the MSO 103, including the content server 110. The user device 201 can comprise any computing device configured to provide access to one or more multimedia asset data files (e.g., Samsung Home-Sync®, Apple TV®, Google TV®, Sony PlayStation®, Microsoft Xbox®, cable box, iPad®, iPhone®, etc. . . . ). The user device 201 can comprise a data output 202. The data output 202 can comprise video data output. The data output 202 can comprise one or more of a High-Definition Multimedia Interface (HDMI) output, a composite video output, an s-video output, a Video Graphics Array (VGA) output, a Digital Visual Interface (DVI) output, a component video output, a serial digital interface (SDI) output, a DisplayPort output, a mobile high-definition link (MHL) output, a universal serial bus (USB) output, a lightning output, combinations thereof, and the like. The user device 201 is configured to receive a signal from the MSO 103 (or other source of multimedia asset data files) such as a content transmission. The content transmission can comprise linear programming and or VHS content (e.g., multimedia asset data files). The user device 201 can reformat the content transmission and provide content for accessing/display via the data output 202. The user device 201 can provide access to content through a user interface such as a program guide. For example, the user device 201 can provide access to a VHS system (e.g., the content server 110) via the user interface. The user interface can comprise a VHS search function and/or a VHS browse function to allow for a particular multimedia asset data file to be searched or browsed. In an aspect, the asset verification system 115 can be programmed to recognize and operate a specific user interface of the MSO 103 and recognize assets of a programmer the asset verification system 115 is searching for.

The asset verification system 115 can comprise a processor 203. The processor 203 can be any computing processing unit or processing device comprising a single-core processor, a single-core processor with software multithread execution capability, multi-core processors, multi-core processors with software multithread execution capability, multi-core processors with hardware multithread technology, parallel platforms, and parallel platforms with distributed shared memory (e.g., a cache). In addition or in the alternative the processor 203 can refer to an integrated circuit with dedicated functionality, such as an application specific integrated circuit (ASIC), a digital signal processor (DSP), a field programmable gate array (FPGA), a complex programmable logic device (CPLD), a discrete gate or transistor logic, discrete hardware components, or any combination thereof designed to perform the functions described herein.

The asset verification system 115 can comprise a memory 204 coupled to the processor 203. The memory 204 can comprise non-transitory computer-readable storage media, such as data storage devices that can be accessed by a computing device, and that provide persistent storage of data and executable instructions (e.g., software applications, programs, functions, and the like). Examples of computer-readable storage media include volatile memory and non-volatile memory, fixed and removable media devices, and any suitable memory device or electronic data storage that maintains data for computing device access. The computer-readable storage media can include various implementations of random access memory (RAM), read-only memory (ROM), flash memory, and other types of storage media in various memory device configurations. The memory 204 provides storage of data and various software applications, such as an operating system that is maintained as a software application with the computer-readable storage media and executed by the processor 203. In this example, the software applications can also include an access module 205, a command module 206, and a verification module 207.

The asset verification system 115 can comprise a data input 208 coupled to the processor 203. The asset verification system 115 can receive data from the data output 202 of the user device 201 via the data input 208. The data input 208 can comprise one or more of a High-Definition Multimedia Interface (HDMI) output, a composite video output, an s-video output, a Video Graphics Array (VGA) output, a Digital Visual Interface (DVI) output, a component video output, a serial digital interface (SDI) output, a DisplayPort output, a mobile high-definition link (MHL) output, a universal serial bus (USB) output, a lightning output, combinations thereof, and the like.

The asset verification system 115 can comprise a remote controller 209 coupled to the processor 203. The remote controller 209 can be configured for transmitting one or more commands (e.g. operational commands) to the user device 201. The remote controller 209 can enable wireless communication through any number of wireless data communication protocols, techniques, or methodologies. For example, the remote controller 209 can support one or more of: RF; LMR; IrDA (Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); wireless home network communication protocols; proprietary wireless data communication protocols such as variants of Wireless USB; and any other protocols for wireless communication.

The asset verification system 115 can comprise a network interface 210. The network interface 210 can provide data connection and/or communication links between the asset verification system 115 and one or more networks and other devices, such as the MSO 103, the network 106, the VHS management system 101, the content provider 102, and the like. In an aspect, the network interface 210 can be configured to allow communication via a wired and/or a wireless network using Ethernet, Wi-Fi, Bluetooth, or any desired method or standard.

In operation, the asset verification system 115 can receive data output from the data output 202 of the user device 201 via the data input 208. The data can comprise a video output. For example, the video output can be content, a program guide, combinations thereof, and the like. The processor 203 can execute the access module 205 to receive the data and virtually access the data. The asset verification system 115, while capable of outputting data to a display device, instead virtually accesses (e.g., reads, processes, analyzes, navigates) the data in the memory 204. The virtual accessing of the data in the memory 204 generates a visual representation of the data in the memory 204 for further processing. The access module 205 can virtually access a user interface of the user device 201. For example, the user interface can comprise a program guide.

Figure 4:
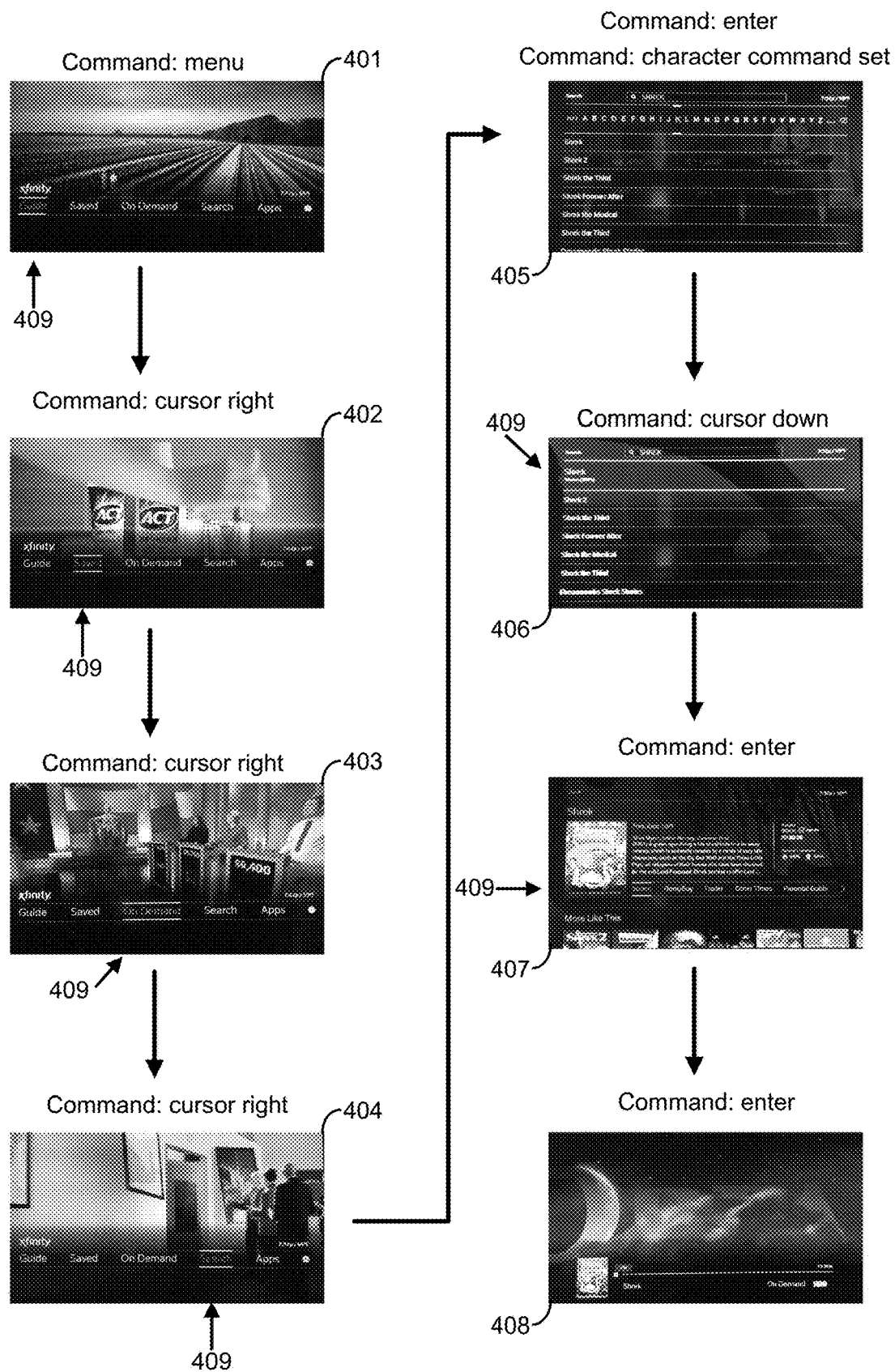
FIG. 4 is an example command set for an asset verification system.
Figure 5:
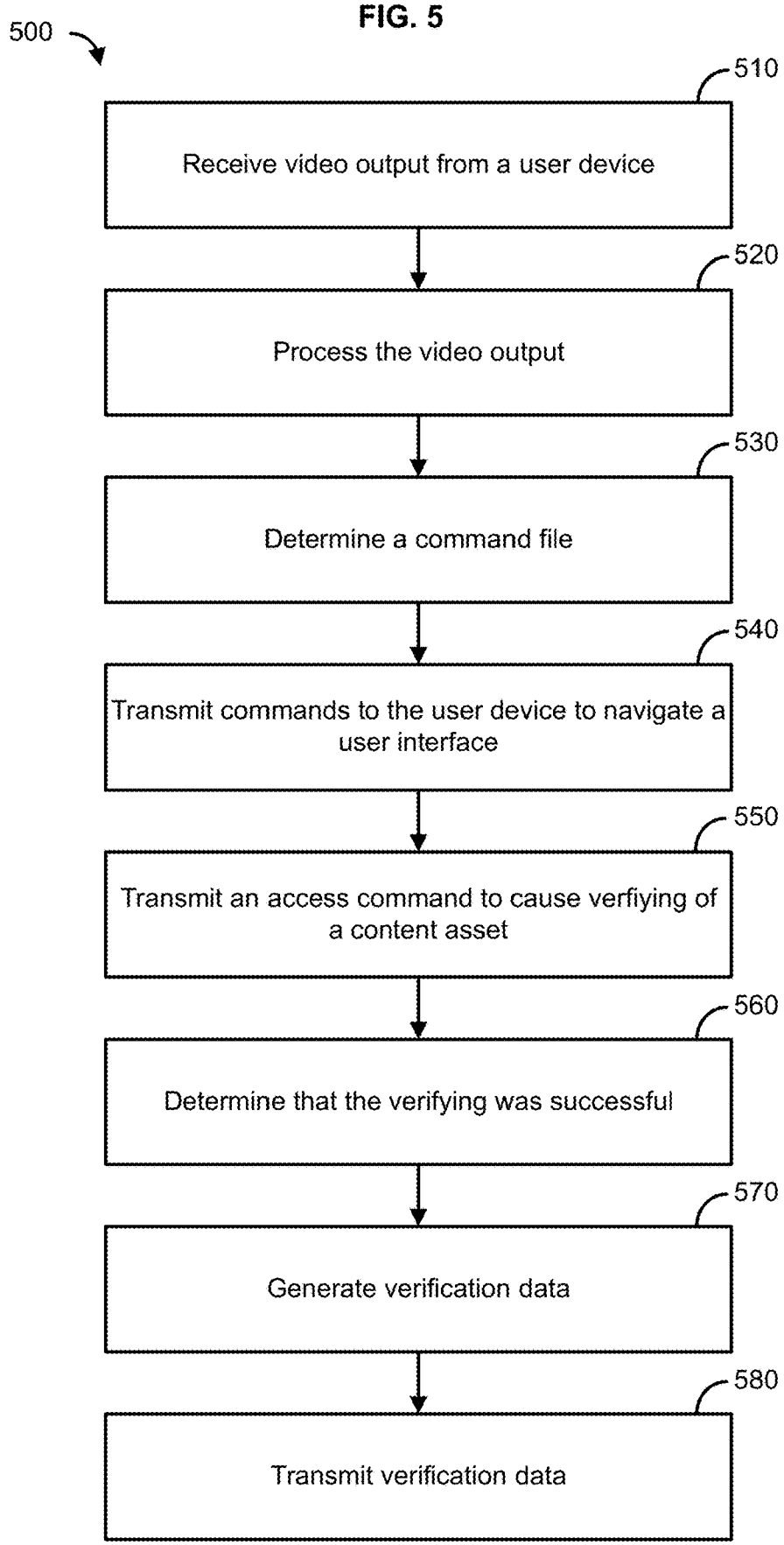
FIG. 5 is an example method for asset verification.
Figure 6:
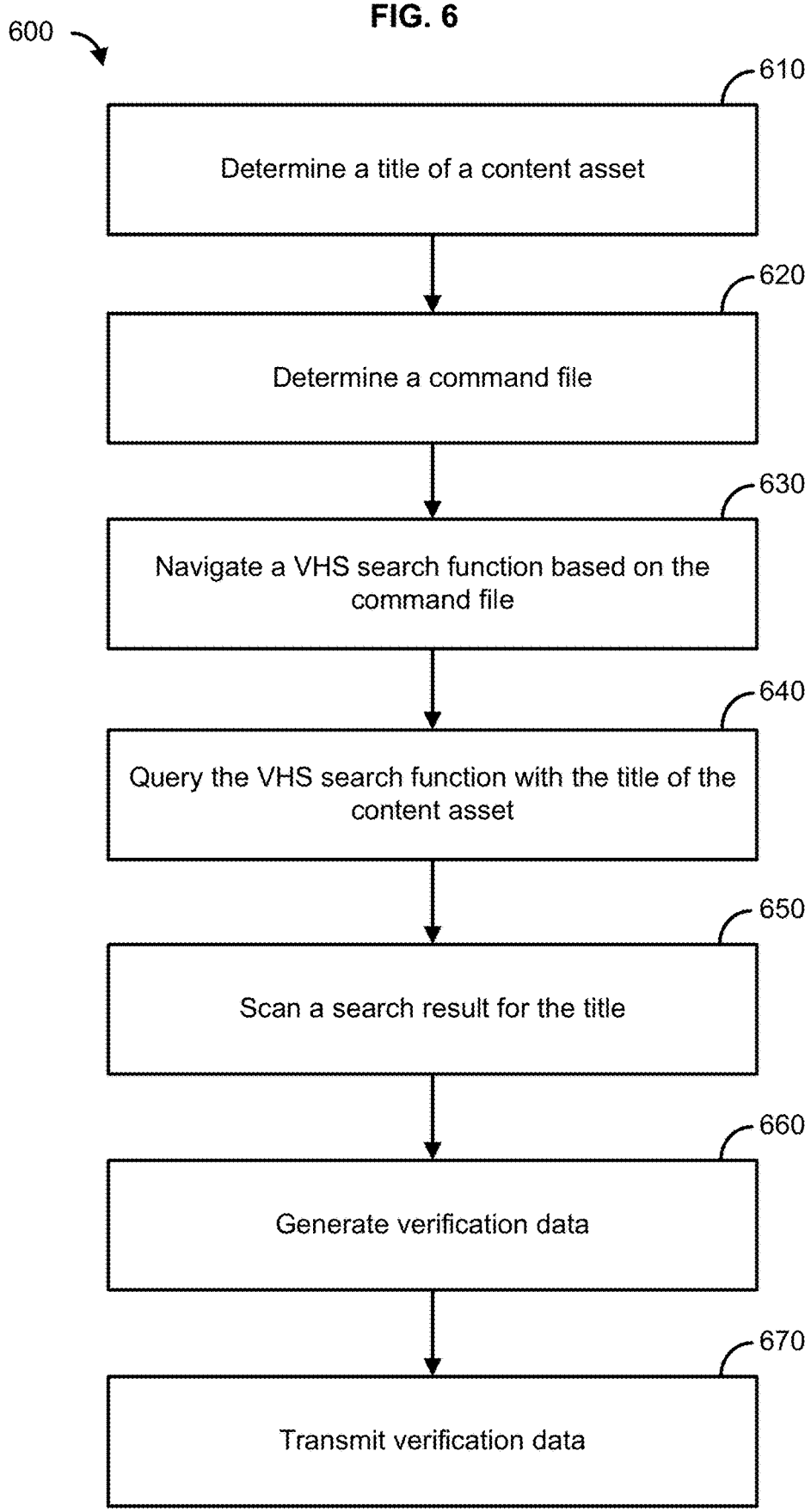
FIG. 6 is an example method for asset verification.

The processor 203 can execute the command module 206 to transmit one or more commands to the user device 201 via the remote controller interface 210. The command module 206 can access a command file stored in the memory 204. The command file can comprise a plurality of commands for navigating the user interface and locating specific content. In an aspect, a plurality of command files can be stored in the memory 204, with each command file being associated with a specific MSO. The command module 206 can determine a MSO that is providing the content transmission to the user device 201 and can determine an appropriate command file associated with the determined MSO. The command file can be unique to each MSO and can contain a defined set of commands that, if followed, can navigate the user interface. The command file can comprise one or more commands to locate a multimedia asset data files (e.g., content asset) in the VHS system (e.g., the content server 110) via the user interface. The one or more commands can comprise a series commands to navigate the user interface to a search function of the VHS system. For example, the series of commands can comprise: menu, cursor right, cursor right, cursor right, enter. FIG. 4 illustrates an example user interface navigable by the example series of commands. The one or more commands can further comprise a character command set corresponding to a string of characters and/or numbers. The character command set can be the title of the multimedia asset data file, for example, "SHREK". As shown in FIG. 4, the series of commands can comprise a "menu" command which navigates the user interface to a screen 401. The screen 401 shows that a cursor 409 indicates that "Guide" is selected. The next command in the series of commands can be a "cursor right" command which navigates the user interface to a screen 402. The screen 402 shows that the cursor 409 has moved to the right and indicates that "Saved" is selected. The next command in the series of commands can be a "cursor right" command which navigates the user interface to a screen 403. The screen 403 shows that the cursor 409 has moved to the right and indicates that "On Demand" is selected. The next command in the series of commands can be a "cursor right" command which navigates the user interface to a screen 404. The screen 404 shows that the cursor 409 has moved to the right and indicates that "Search" is selected. The next command in the series of commands can be an "enter" command which navigates the user interface to a screen 405. The screen 405 shows that the user interface has updated to reflect a search function. The next command in the series of commands can be a character command set comprising the string "SHREK". The character command set causes the string "SHREK" to be entered into a search field in the screen 405. As the character command set is entered, search results appear beneath the search field. In another aspect, the character command set can comprise a series of commands to navigate an onscreen keyboard to cause the string to be entered via the onscreen keyboard. In an aspect, the command module 206 can terminate further commands and the verification module 207 can verify the presence of "SHREK" in the search results as described below. In another aspect, the command module 206 can send further commands to request the multimedia asset data file be accessed. The next command in the series of commands can be a "cursor down" command which navigates the user interface to a screen 406. The screen 406 shows that the cursor 409 has moved down from the search field and indicates that "SHREK" is selected. The next command in the series of commands can be an "enter" command which navigates the user interface to a screen 407. The screen 407 shows that the user interface has updated to reflect details for the multimedia asset data file "SHREK" (e.g., pricing (free), availability end date, actor names, summary, ratings, and the like). The screen 407 shows that the cursor 409 indicates that "Watch" is selected. The next command in the series of commands can be an "enter" command which navigates the user interface to a screen 408. The screen 408 is a virtual accessing (e.g., verifying, reading, navigating, processing, capturing, analyzing, receiving, rendering without display-ing to a user) of the multimedia asset data file "SHREK". The series of commands described with regard to FIG. 4 are examples of commands. The series of commands can change in both order and command based on the particular user interface used.

The one or more commands can comprise a search command to cause the search function to search for the title of the content asset. A search result generated by the search command can comprise the title of the multimedia asset data file and/or an asset ID associated with the multimedia asset data file. In a further aspect, the command file can comprise one or more commands to transmit an access command to the user device 201 via the remote controller 210. If the multimedia asset data file is located, the command module 206 can cause the remote controller 210 to transmit the access command to cause the user device 201 to transmit the multimedia asset data file to the asset verification system 115 via the data output 202 and the data input 208. The access module 205 can virtually access the multimedia asset data file.

The verification module 207 can verify that the multimedia asset data file is present in the search result or not. The verification module 207 can further verify that the multimedia asset data file was successfully virtually accessed or not. The verification module 207 can comprise an optical character recognition (OCR) function. The OCR function can comprise one or more algorithms that can recognize symbols, letters, characters, digits, and the like. The OCR function can scan the search result and store one or more recognized strings. The one or more recognized strings can be compared to the title of the multimedia asset data file to determine that the multimedia asset data file is available or is not available. In the event the verification system 115 is used to virtually access the multimedia asset data file in a scenario where the multimedia asset data file is located in the search result, the verification module 207 can confirm that the multimedia asset data file was accessed for a predetermined duration or that virtually accessing the multimedia asset data file failed.

In an aspect, if title of the multimedia asset data file is identified in the search result, the verification module 207 can generate verification data. If the multimedia asset data file is virtually accessed successfully the verification module 207 can generate verification data. The verification data can reflect the availability of the multimedia asset data file. The verification data can comprise, for example, a log comprising the content provider 102 (e.g., provider ID) that is the source of the multimedia asset data file, the title of the multimedia asset data file, an identifier of the multimedia asset data file (e.g., asset identifier provided by the content provider 102 and/or the globally unique identifier provided by the VHS management system 101), and a timestamp indicative of a date and/or time that the multimedia asset data file was identified in a search result or was successfully accessed. The asset verification system 115 can communicate the verification data to one or more of the VHS management system 101, the content provider 102, and the MSO 103. The verification data can then be transmitted to a database and updated as more assets are acquired. In an aspect, the KPI dashboard can be updated according to the verification data and verification data can be accumulated for trending analysis.

While described herein in the context of a multimedia asset data file as a video, the asset verification system 115 can capture motion images, still images, motion vectors, text, objects, relationships between objects, camera motion, angle, watermarks, logos, fingerprints, lower thirds, lighting, and other video characters for review and for both qualitative and quantitative analysis. In an aspect, the asset verification system 115 can capture other data related to, but not limited to, Nielsen data, V-chip information, Secondary Audio Programs (SAP), closed captioning, subtitling, and any other data inserted into the vertical interval or on the screen. The asset verification system 115 can also be configured for use with any device that outputs video and/or audio including mobile devices like phones or tablets. The asset verification system 115 can test, record, store, analyze non-VHS content, like linear streams on any device. For example, wearable devices, digital cinema in theaters, watermarks, subtitling, and alternate language tracks. The asset verification system 115 can also perform data mining of all available assets on any device and store metadata on those assets for analytics of historical information down to specific regions and distributors that could be leveraged in the marketplace. Availability and cost can be tracked on every network on every MSO.

A method 500 is disclosed for verifying availability of a content asset comprising receiving a video output from a user device at 510. Receiving the video output from the user device can comprise receiving the video output from a High-Definition Multimedia Interface (HDMI) port of the user device. The method 500 can further comprise receiving data comprising information associated with one or more of a plurality of content assets. For example, the information received can comprise a title of each of the plurality of content assets, an identifier of each of the plurality of content assets, a content provider of each of the plurality of content assets, and the like.

The method 500 can comprise virtually accessing (e.g., verifying, reading, navigating, processing, capturing, analyzing, receiving, rendering without displaying to a user, simulate viewing by a user, or any combination thereof) the video output to generate a user interface at 520. As such, sampling of the video can be enabled to convert one or more moving images to one or more static images. The static image can then be virtually accessed to generate the user interface. For example, by decoding the video output from the HDMI port and accessing the video output in a memory of a computing device. In an aspect, the memory can be a rasterized image held in the memory or real-time samples directly from the HDMI interface.

The method 500 can comprise determining a command file comprising a plurality of commands for navigating the user interface at 530. If a command file does not exist, the system can systematically step through one or more known menu structures in an attempt to match known content assets. In an aspect, if a content asset is ultimately matched, the menu structure can be used to create the command file. Determining the command file comprising one or more commands for navigating the user interface can comprise determining a service provider of the content asset and determining the command file from a plurality of command files based on the service provider. The service provider can comprise an MSO and/or an MVPD.

The method 500 can comprise transmitting one or more commands of the plurality of commands to the user device via a remote controller, wherein the one or more commands are based on the command file and the one or more commands locate a content asset via the user interface at 540. The remote controller can comprise an infrared (IR) transmitter, a serial communication device (e.g., RS-485, RS-232, and the like), and the like. The remote controller can further be configured to utilize one or more of HDMI return path signaling or an IP based protocol. Transmitting the one or more commands to the user device via the remote controller, wherein the one or more commands are based on the command file and the one or more commands locate the content asset via the user interface can comprise determining a first series of the one or more commands to navigate the user interface to a video hosting and streaming (VHS) search function, transmitting the first series of the one or more commands via the remote controller to the user device, transmitting a character command set corresponding to the title of the content asset, and transmitting a search command to cause the VHS search function to search for the title of the content asset.

The method 500 can comprise transmitting a menu command to the user device via the remote controller to virtually access (e.g., verify, read, navigate, process, capture, analyze, receive, render without displaying to a user, simulate viewing by a user, or any combination thereof) the content asset within the video output at 550. Transmitting the access command to the user device via the remote controller to virtually access the content asset within the video output can comprise determining the access command based on the command file, wherein the access command navigates the user interface to request that the content asset be accessed. As such, the user device can access and output accessed video, audio, and menu information.

The method 500 can comprise determining that the content asset was successfully virtually accessed within the video output at 560. Determining that the content asset was successfully virtually accessed within the video output can comprise determining that the content asset was virtually accessed for a predetermined amount of time.

The method 500 can comprise generating verification data for the content asset based on the successful virtual accessing of the content asset at 570. Generating verification data for the content asset based on the successful virtual accessing of the content asset can comprise generating a log comprising the service provider, the title of the content asset, and a timestamp that the content asset was successfully virtually accessed. The method 500 can further comprise transmitting the verification data to a remote computing device.

The method 500 can comprise transmitting the verification data at 580. For example, the verification data can be transmitted to a central server. The central server can be configured to provide a user interface for analyzing the verification data. For example, the user interface can be configured to provide statistics. The user interface can comprise key performance indicator dashboard.

A method 600 is disclosed for verifying availability of a content asset comprising determining a service provider and a title of a content asset associated with the service provider at 610.

The method 600 can comprise determining a command file associated with the service provider at 620. Determining the command file associated with the service provider comprises determining the command file from a plurality of command files based on the service provider.

The method 600 can comprise navigating to a VHS search function of a menu of a client device based on the command file at 630. Navigating to the VHS search function of the menu of the client device based on the command file comprises receiving a video output from a High-Definition Multimedia Interface (HDMI) port of the user device. The method 600 can further comprise virtually accessing (e.g., verifying, reading, navigating, processing, capturing, analyzing, receiving, rendering without displaying to a user, simulating viewing by a user, or any combination thereof)

the video output to generate the menu by decoding the video output from the HDMI port and accessing the video output in a memory of a computing device. Navigating to the VHS search function of the menu of the client device based on the command file can comprise determining a first series of one or more commands from the command file to navigate the menu to the VHS search function and transmitting the first series of one or more commands via a remote controller to the user device.

The method 600 can comprise querying the VHS search function with the title to generate a search result at 640. Querying the VHS search function with the title to generate a search result can comprise transmitting a character command set corresponding to the title of the content asset and transmitting a search command to cause the VHS search function to search for the title of the content asset.

The method 600 can comprise scanning the search result to determine that the title of the content asset is present in the search result at 650. Scanning the search result to determine that the title of the content asset is present in the search result comprises analyzing the search result with an optical character recognition (OCR) function to determine whether the title of the content asset is present in the search result.

The method 600 can further comprise transmitting an access command to the user device via a remote controller to virtually access (e.g., verify, read, navigate, process, capture, analyze, receive, render without displaying to a user, simulate viewing by a user, or any combination thereof) the content asset. Transmitting the access command to the user device via the remote controller to virtually access the content asset comprises determining the access command based on the command file, wherein the access command navigates the menu to request that the content asset be accessed. The method 600 can further comprise determining that the content asset was successfully virtually accessed for a predetermined amount of time.

The method 600 can comprise generating verification data for the content asset based on the presence of the title of the content asset in the search result at 660. Generating verification data for the content asset based on the presence of the title of the content asset in the search result comprises generating a log comprising the service provider, the title of the content asset, and a timestamp that the title of the content asset was present in the search result.

The method 600 can comprise transmitting the verification data at 670. For example, the verification data can be transmitted to a central server. The central server can be configured to provide a user interface for analyzing the verification data. For example, the user interface can be configured to provide statistics. The user interface can comprise key performance indicator dashboard.

Figure 7:
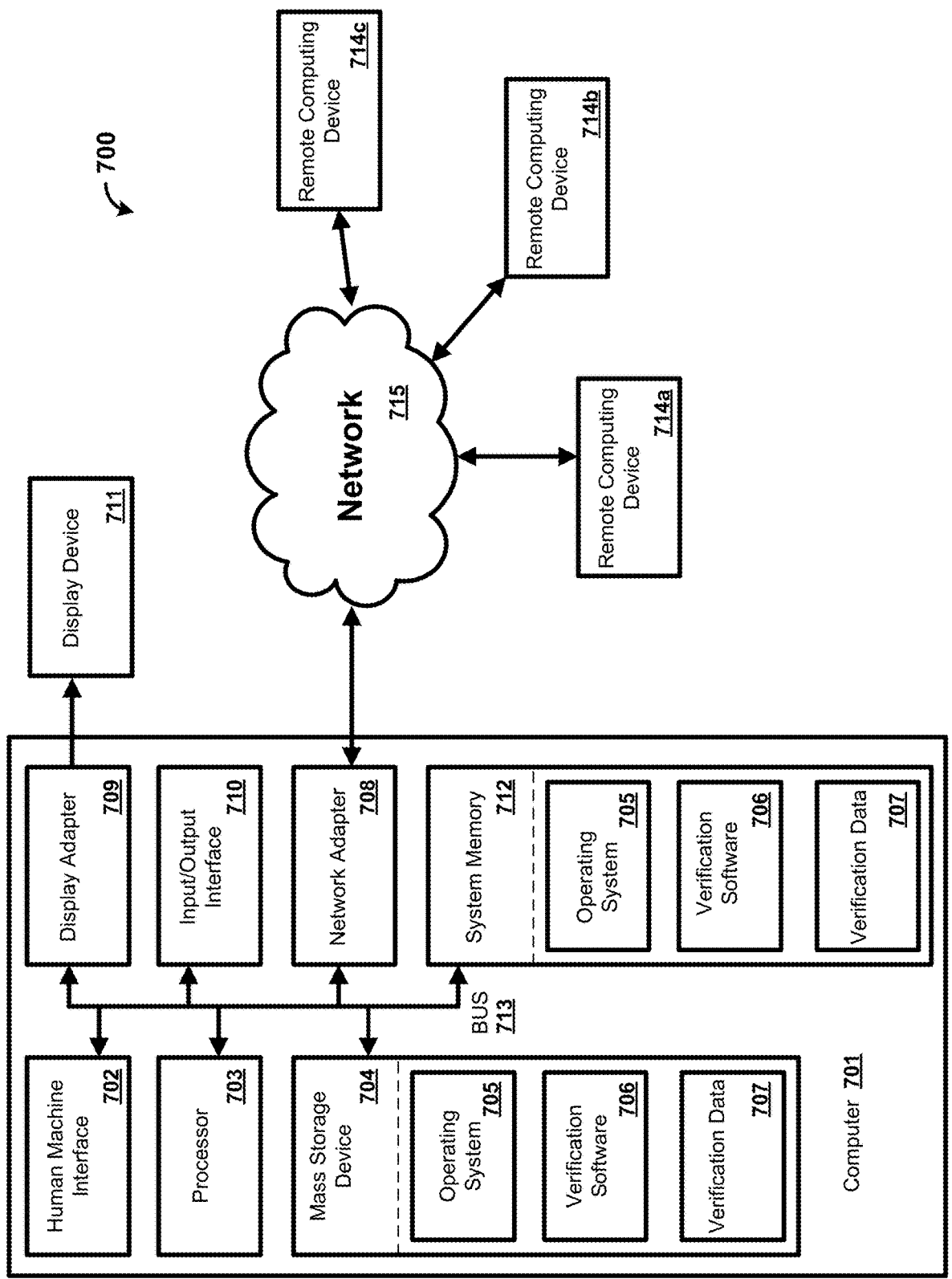
FIG. 7 is an example computing device.

In an aspect, the methods and systems can be implemented on a computer 701 as illustrated in FIG. 7 and described below. By way of example, the VHS management system 101, the pitcher 104, the catcher 105, the push server 109, the content server 110, the application server 111, the interface 114, and/or the asset verification system of FIG. 1 and/or the user device 201 of FIG. 2 can comprise one or more computers 701 as illustrated in FIG. 7. Similarly, the methods and systems disclosed can utilize one or more computers to perform one or more functions in one or more locations. FIG. 7 is a block diagram illustrating an exemplary operating environment 700 for performing the disclosed methods. This exemplary operating environment 700 is only an example of an operating environment and is not intended to suggest any limitation as to the scope of use or functionality of operating environment architecture. Neither should the operating environment 700 be interpreted as having any dependency or requirement relating to any one or combination of components illustrated in the exemplary operating environment 700.

The present methods and systems can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, and distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, and/or the like that perform particular tasks or implement particular abstract data types. The disclosed methods can also be practiced in grid-based and distributed computing environments where tasks are performed by remote processing devices that are linked through a communications network. In a distributed computing environment, program modules can be located in local and/or remote computer storage media including memory storage devices.

Further, one skilled in the art will appreciate that the systems and methods disclosed herein can be implemented via a general-purpose computing device in the form of a computer 701. The computer 701 can comprise one or more components, such as one or more processors 703, a system memory 712, and a bus 713 that couples various components of the computer 701 including the one or more processors 703 to the system memory 712. In the case of multiple processors 703, the computer 701 can utilize parallel computing.

The bus 713 can comprise one or more of several possible types of bus structures, such as a memory bus, memory controller, a peripheral bus, an accelerated graphics port, and a processor or local bus using any of a variety of bus architectures. The computer 701 typically comprises a variety of computer readable media. Exemplary readable computer readable media can be any available media that is accessible by the computer 701 and comprises, for example and not meant to be limiting, both volatile and non-volatile media, removable and non-removable media. The system memory 712 can comprise computer readable media in the form of volatile memory, such as random access memory (RAM), and/or non-volatile memory, such as read only memory (ROM). The system memory 712 typically can comprise data such as verification data 707 and/or program modules such as operating system 705 and verification software 706 that are accessible to and/or are operated on by the one or more processors 703.

In another aspect, the computer 701 can also comprise other removable/non-removable, volatile/non-volatile computer storage media. The mass storage device 704 can provide non-volatile storage of computer code, computer readable instructions, data structures, program modules, and other data for the computer 701. For example, a mass storage device 704 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 704, including by way of example, an operating system 705 and verification software 706. One or more of the operating system 705 and the verification software 706 (or some combination thereof) can comprise program modules and the verification software 706. The verification data 707 can also be stored on the mass storage device 704. The verification data 707 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple locations within the network 715.

In another aspect, the user can enter commands and information into the computer 701 via an input device (not shown). Examples of such input devices comprise, but are not limited to, a keyboard, pointing device (e.g., a computer mouse, remote control), a microphone, a joystick, a scanner, tactile input devices such as gloves, and other body coverings, motion sensor, and the like These and other input devices can be connected to the one or more processors 703 via a human machine interface 702 that is coupled to the bus 713, but can be connected by other interface and bus structures, such as a parallel port, game port, an IEEE 1394 Port (also known as a Firewire port), a serial port, network adapter 708, and/or a universal serial bus (USB).

In yet another aspect, a display device 711 can also be connected to the bus 713 via an interface, such as a display adapter 709. It is contemplated that the computer 701 can have more than one display adapter 709 and the computer 701 can have more than one display device 711. For example, a display device 711 can be a monitor, an LCD (Liquid Crystal Display), light emitting diode (LED) display, television, smart lens, smart glass, and/or a projector. In addition to the display device 711, other output peripheral devices can comprise components such as speakers (not shown) and a printer (not shown) which can be connected to the computer 701 via Input/Output Interface 710. Any step and/or result of the methods can be output in any form to an output device. Such output can be any form of visual representation, including, but not limited to, textual, graphical, animation, audio, tactile, and the like. The display 711 and computer 701 can be part of one device, or separate devices.

The computer 701 can operate in a networked environment using logical connections to one or more remote computing devices 714a,b,c. By way of example, a remote computing device 714a,b,c can be a personal computer, computing station (e.g., workstation), portable computer (e.g., laptop, mobile phone, tablet device), smart device (e.g., smartphone, smart watch, activity tracker, smart apparel, smart accessory), security and/or monitoring device, a server, a router, a network computer, a peer device, edge device or other common network node, and so on. Logical connections between the computer 701 and a remote computing device 714a,b,c can be made via a network 715, such as a local area network (LAN) and/or a general wide area network (WAN). Such network connections can be through a network adapter 708. A network adapter 708 can be implemented in both wired and wireless environments. Such networking environments are conventional and commonplace in dwellings, offices, enterprise-wide computer networks, intranets, and the Internet. In an aspect, one or more of the remote computing devices 714a,b,c can comprise a VHS service for streaming content assets to the computer 701

For purposes of illustration, application programs and other executable program components such as the operating system 705 are illustrated herein as discrete blocks, although it is recognized that such programs and components can reside at various times in different storage components of the computing device 701, and are executed by the one or more processors 703 of the computer 701. An implementation of verification software 706 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" can comprise volatile and non-volatile, removable and non-removable media implemented in any methods or technology for storage of information such as computer readable instructions, data structures, program modules, or other data. Exemplary computer storage media can comprise RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ artificial intelligence (AI) techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:
   generating, based on a video output from a user device, a user interface;
   generating, based on one or more stored menu structures, a command file, wherein the command file comprises a plurality of commands for navigating the user interface;
   sending, to the user device, based on the command file and via a remote controller, one or more commands of the plurality of commands, wherein the one or more commands are associated with locating a content asset via the user interface;
   sending, to the user device, via the remote controller, an access command, wherein the access command causes the content asset to be output via the video output;
   determining, based on the content asset being output, that the content asset is verified as currently available; and
   sending, to a storage device, based on determining that the content asset is verified, verification data.

2. The method of claim 1, further comprising receiving the video output from a High-Definition Multimedia Interface (HDMI) port of the user device.

3. The method of claim 2, wherein generating the user interface comprises:
   decoding the video output from the HDMI port; and
   processing the video output in a memory of a computing device.

4. The method of claim 1, wherein generating the command file comprises:
   determining, based on a service provider, that a stored menu structure of the one or more stored menu structures is associated with the content asset; and
   generating, based on the stored menu structure, the command file.

5. The method of claim 1, wherein sending the one or more commands comprises:
   determining a series of commands of the one or more commands to navigate the user interface to a video host and stream (VHS) search function;
   sending, to the user device, via the remote controller, the series of commands;
   sending a character command set corresponding to a title of the content asset; and
   sending a search command of the one or more commands, wherein the search command causes the VHS search function to search for the title of the content asset.

6. The method of claim 1, wherein the access command causes a file comprising the content asset to be accessed.

7. The method of claim 1, wherein determining that the content asset is verified as currently available comprises determining that the content asset is output for a time period.

8. The method of claim 1, wherein the verification data comprises a service provider associated with the content asset, a title of the content asset, and a timestamp indicative of when the content asset is output.

9. A method comprising:
   determining a service provider and a title of a content asset associated with the service provider;
   generating, based on one or more stored menu structures, a command file;
   navigating, based on the command file, to a video host and stream (VHS) search function of a menu of a user device;
   determining, based on the VHS search function and the title, a search result, wherein the search result indicates the content asset;
   causing, based on the search result, the content asset to be output; and
   sending, to a storage device, based on the content asset being output, verification data.

10. The method of claim 9, wherein generating the command file comprises:
    determining, based on the service provider, that a stored menu structure of the one or more stored menu structures is associated with the content asset; and
    generating, based on the stored menu structure, the command file.

11. The method of claim 9, wherein navigating to the VHS search function comprises receiving a video output from a High-Definition Multimedia Interface (HDMI) port of the user device.

12. The method of claim 11, further comprising processing the video output to generate the menu, wherein processing the video output comprises:
    decoding the video output from the HDMI port; and
    processing the video output in a memory of a computing device.

13. The method of claim 9, wherein navigating to the VHS search function comprises:
    determining, based on the command file, one or more commands associated with the VHS search function; and
    sending, to the user device, via a remote controller, the one or more commands.

14. The method of claim 9, wherein determining the search result comprises:
    sending, to the user device, a character command set corresponding to the title of the content asset; and
    sending, based on the command file, a search command that causes the VHS search function to search for the title.

15. The method of claim 9, further comprising:
    analyzing, based on optical character recognition (OCR), the search result; and
    determining that the title of the content asset is present in the search result.

16. The method of claim 9, wherein causing the content asset to be output comprises sending, to the user device, via a remote controller, an access command.

17. The method of claim 16, wherein sending the access command comprises determining, based on the command file, the access command.

18. The method of claim 17, further comprising determining that the content asset is output for a time period.

19. The method of claim 9, wherein the verification data comprises the service provider, the title of the content asset, and a timestamp indicative of when the content asset is outputted.

20. A system comprising:
    a remote controller, coupled to a network device, configured to:
       send, based on a command file, one or more commands, wherein the one or more commands locate a content asset in a video host and stream (VHS) system; and
       send an access command;
    the network device configured to:
       access a video output;
       generate, based on the video output, a user interface associated with the VHS system;

generate, based on one or more stored menu structures, the command file; and generate, based on the content asset being outputted, verification data, wherein the verification data indicates that the content asset is currently available in the VHS system; and a user device configured to:

generate the video output;

receive the access command; and output, based on the access command, the content asset.

* * * * *